United States Patent
Kawai et al.

(10) Patent No.: US 9,982,815 B2
(45) Date of Patent: May 29, 2018

(54) THREADED JOINT FOR OIL COUNTRY TUBULAR GOODS

(71) Applicant: JFE Steel Corporation, Tokyo (JP)

(72) Inventors: Takamasa Kawai, Handa (JP); Kazunari Takahashi, Handa (JP); Hiroshi Chikatsune, Handa (JP); Masaki Yoshikawa, Handa (JP); Jun Takano, Handa (JP); Takuya Nagahama, Handa (JP); Masateru Ueta, Handa (JP); Hideo Sato, Handa (JP); Haruhiko Seki, Handa (JP); Tsuyoshi Yoneyama, Handa (JP)

(73) Assignee: JFE Steel Corporation (JP)

( * ) Notice: Subject to any disclaimer, the term of this patent is extended or adjusted under 35 U.S.C. 154(b) by 337 days.

(21) Appl. No.: 14/908,062

(22) PCT Filed: Jul. 29, 2014

(86) PCT No.: PCT/JP2014/003973
§ 371 (c)(1),
(2) Date: Jan. 27, 2016

(87) PCT Pub. No.: WO2015/015799
PCT Pub. Date: Feb. 5, 2015

(65) Prior Publication Data
US 2016/0178095 A1    Jun. 23, 2016

(30) Foreign Application Priority Data

Jul. 30, 2013   (JP) .................................. 2013-157315

(51) Int. Cl.
*F16L 15/06*   (2006.01)
*E21B 17/08*   (2006.01)
*E21B 17/042*  (2006.01)

(52) U.S. Cl.
CPC ............ *F16L 15/06* (2013.01); *E21B 17/042* (2013.01); *E21B 17/08* (2013.01)

(58) Field of Classification Search
CPC ......... E21B 17/08; F16L 15/06; F16L 15/004; F16L 15/009
See application file for complete search history.

(56) References Cited

U.S. PATENT DOCUMENTS 3,572,777 A * 3/1971 Blose .................... F16L 15/004
                                                    285/334
4,822,081 A * 4/1989 Blose .................... E21B 17/08
                                                    285/334

(Continued)

FOREIGN PATENT DOCUMENTS

JP     9-152067 A    6/1997
JP     10-96489 A    4/1998

(Continued)

OTHER PUBLICATIONS

Supplementary European Search Report dated Jul. 15, 2016, of corresponding European Application No. 14832228.2.

(Continued)

*Primary Examiner* — David E Bochna
(74) *Attorney, Agent, or Firm* — DLA Piper LLP (US)

(57) ABSTRACT

A premium threaded joint has a pin-side shoulder angle $\theta_1$, a box-side shoulder angle $\theta_2$, a seal interference quantity $\delta$ and a seal point distance xp satisfying $\theta_2 - \theta_1 = \alpha \times \delta / xp$, $\alpha = 7$ to 14, and a pin distal end thickness $tp_1$ defined by a difference $Re - Ri$ between a radius $Re$ of a pin most distal end portion and an inner radius $Ri$ of a pin distal end portion is 0.25 times or more as large as a pin raw pipe thickness $tp_0$.

1 Claim, 3 Drawing Sheets

(56) References Cited

U.S. PATENT DOCUMENTS

| | | | | |
|---|---|---|---|---|
| 5,649,725 | A | * 7/1997 | Nagasaku | F16L 15/004 |
| | | | | 285/334 |
| 6,045,165 | A | * 4/2000 | Sugino | F16L 15/004 |
| | | | | 285/333 |
| 2012/0133129 | A1 | 5/2012 | Hignett et al. | |

FOREIGN PATENT DOCUMENTS

| | | |
|---|---|---|
| JP | 2000-314490 A | 11/2000 |
| JP | 2013-29177 A | 2/2013 |
| JP | 2013-524116 A | 6/2013 |
| WO | 2012/056500 A1 | 5/2012 |

OTHER PUBLICATIONS

Japanese Office Action dated Mar. 3, 2015, of corresponding Japanese Application No. 2013-157315, along with a Concise Statement of Relevance of Office Action in English.

* cited by examiner

A PORTION   B PORTION   AXIS

ENLARGED VIEW OF A PORTION

ENLARGED VIEW OF B PORTION

THREADED JOINT FOR OIL COUNTRY TUBULAR GOODS

TECHNICAL FIELD

This disclosure relates to a threaded joint for an oil country tubular goods having excellent durability and, more particularly, to a threaded joint for an oil country tubular goods having excellent durability suitable for the connection of steel pipes such as an oil country tubular goods which include, in the same category, tubings or casings used for search and production of an oil well or a gas well in general, that is, an OCTG (oil country tubular goods), riser pipes or line pipes.

BACKGROUND

A threaded joint has been popularly used to connect steel pipes used in a petroleum installation for oil industry such as oil country tubular goods. In connecting steel pipes used for search and production of oil or gas, conventionally, a standard threaded joint stipulated in API (American Petroleum Institute) standard has been typically used. However, recently, deepening of a well for crude oil or natural gas has progressed and the number of horizontal wells and directional wells from vertical wells has been increasing. Hence, the drilling and production environment has become difficult. Further, the number of wells developed in a severe circumstance such as oceans and polar regions has been increasing. Hence, the performance levels which threaded joints have to satisfy are diversified including compression resistance, bending resistance, and sealability against external pressure (external pressure resistance). In view of the above, the number of instances where a special threaded joint having high performances referred to as "premium joint" is being used has increased, and the demand to improve performances of the premium joint has been also steadily increased.

A premium joint is a coupling-type joint where externally-threaded members (hereinafter referred to as "pins") each of which includes tapered threads, seal portions (to be more specific, metal to metal seal portions) and shoulders (to be more specific, torque shoulders) and are formed on pipe end portions, and an internally-threaded member which includes tapered threads, seal portions (to be more specific, metal to metal seal portions) and shoulders (to be more specific, torque shoulders) and connects the pins to each other (hereinafter referred to as "box") are jointed to each other. The tapered threads are important to firmly fix the pipe joint, the seal portions play a role of ensuring gas tightness by bringing the box and the pins into metal contact at such portions, and the shoulders form shoulder faces which play the role of abutments during make-up of the joint.

FIGS. 4A-4C are schematic explanatory views showing a conventional example of an oil-well-pipe use premium joint. FIGS. 4A-4C are also longitudinal cross-sectional views of a threaded joint of a circular pipe (a cross-sectional view where a tube axis extends in the cross section). The threaded joint includes pins 3 and a box 1 corresponding to the pins 3. The pin 3 has an externally-threaded portion 7 and a nose (also referred to as a pin nose) 8 which is an elongated portion formed adjacent to the externally-threaded portion 7 on each distal end side of the pin 3 on an outer surface thereof and having no threads. The nose 8 has a seal portion (to be more specific, a metal to metal seal portion) 11 on an outer peripheral surface thereof, and a shoulder 12 on an end surface thereof. The box 1 corresponding to the pins 3 has internally-threaded portions 5, seal portions 13 and shoulders 14 on an inner surface thereof, and these portions are portions threadedly engaged with or brought into contact with the externally-threaded portions 7, the seal portions 11 and the shoulders 12 of the pins 3 respectively. In FIG. 4A, symbol AXIS indicates a tube axis, and tp0 indicates a pin raw pipe thickness.

In the conventional example shown in FIGS. 4A-4C, the threaded joint is of a type where the seal portion 11 is formed on a distal end portion of the pin 3, and desired sealability can be realized by imparting an appropriate make up torque. However, the make up torque is influenced by the lubrication condition, a surface quality and the like. As a design of a threaded joint which does not largely depend on these factors, there has been known a radial-directional seal method (also referred to as a "radial seal type") where a radial directional component of a seal contact pressure is relatively increased.

With respect to the point that the seal portion is provided at a portion different from the shoulder, the radial-seal-type threaded joint is substantially equal to the threaded joint of a type having the seal portion on the distal end portion of the pin.

As a function which a threaded joint for an oil country tubular goods is required to possess besides a sealing property, corrosion resistance against crevice corrosion is named. Crevice corrosion occurs when a corrosive fluid infiltrates into a minute gap formed between the pin and the box, stagnates and condenses in the gap. In the threaded joint, particularly the gap between the shoulder faces is believed as being a problematic place where crevice corrosion is liable to occur.

As a means of overcoming the above-mentioned problem, it is known that a shoulder angle on a pin side is designed to be smaller than a shoulder angle on a box side by 0.5 to 4.0 degrees in advance by taking into consideration a difference in shoulder angle brought about by diametrically reduced deformation of a distal end of the pin due to a contact force of the seal portion thus making the shoulders uniformly contact with each other at the time of contact (see Japanese Unexamined Patent Application Publication No. 9-152067). According to such an approach, it is possible to prevent formation of a gap on an inner surface side or occurrence of the excessively large plastic deformation due to a non-uniform contact so that it is possible to acquire a threaded joint for an oil country tubular goods which can withstand being used some dozen times and prevents the occurrence of crevice corrosion. Further, the difference in shoulder angle may preferably be set in accordance with two parameters, that is, D/t which is a ratio between an outer diameter D of the pin or the box and a wall thickness t of the pin or the box and the difference $\delta r$ ($=\delta s - \delta t$) between a fitting margin $\delta s$ in a radial direction of a seal forming surface and a fitting margin $\delta t$ in a radial direction of a thread forming surface.

However, the known methods cannot suppress plastic deformation of the whole pin distal end when a compressive load is applied, and a gap is generated between the shoulder faces due to the excessively large plastic deformation of front surfaces of the shoulders of the pin distal ends when a compressive load is applied to the area where crevice corrosion is liable to occur.

SUMMARY

We found that, to prevent the excessively large deformation of the shoulder, besides setting the difference in shoulder angles, it is necessary to define a pin distal end thickness to suppress plastic deformation of the whole pin distal end when a compressive load is applied.

We thus provide:

(1) A threaded joint for an oil country tubular goods having excellent durability which includes:

pins each of which occupies a pipe end portion of a steel pipe for an oil well pipe, and includes an externally-threaded portion, a nose which extends toward a pipe end side from the externally-threaded portion, and a shoulder forming a distal end surface of the nose; and a box which includes internally-threaded portions each forming a threaded portion by being threadedly joined with the externally-threaded portion, and shoulders which are brought into contact with the shoulders of the pins, the pins and the box are joined to each other by the threaded joining so that portions between the threaded portions and the shoulders are brought into metal-to-metal contact with each other thus forming seal portions which seal a fluid at the contact portions, and the shoulders of the pins and the shoulders of the box are brought into contact with each other at the time of make-up the threaded joint thus forming shoulders, wherein a pin-side shoulder angle θ1, a box-side shoulder angle θ2, a seal interference quantity δ and a seal point distance xp which are defined below satisfy a relationship $$\theta2-\theta1=\alpha \times \delta/xp, \alpha=7 \text{ to } 14, \text{ and}$$

a pin distal end thickness tp1 which is defined by a difference Re−Ri between a radius Re of a pin most distal end portion and an inner radius Ri of a pin distal end portion is 0.25 times or more as large as a pin raw pipe thickness tp0.

The definitions of θ1, θ2, δ and xp are as follows:

(i) The pin-side shoulder angle θ1 is a value of an angle (degrees) of an intersecting angle between an orthogonal line of tube axis and the pin-side shoulder at an acute angle side.

(ii) The box-side shoulder angle θ2 is a value of an angle (degrees) of an intersecting angle between the orthogonal line of tube axis and the box-side shoulder on an acute angle side.

(iii) The seal interference quantity δ is a maximum value of a length in a pipe radial direction of an overlapping portion where cross-sectional views at the same scale of both the pin and the box in a tube axis direction are made to overlap with each other such that a tube axis of the pin 3 and a tube axis of the box 1 agree with each other and positions in a tube axis direction of points remotest from the tube axes in the respective shoulders of both the pin and the box agree with each other.

(iv) The seal point distance xp is a distance in a tube axis direction from a seal point SP which is a pin outer diameter in-plane position where a length of the overlapping portion in a pipe radial direction becomes the largest to a pin most distal end position.

Units of the length and the distance are one kind (for example, ["](inch)) selected from a group consisting of plural kinds of units (for example, ["](inch), [mm] and the like).

By adopting the above-mentioned approach, it is possible to prevent not only local plastic deformation on a shoulder caused by diametrically reduced deformation of a pin distal end due to a contact force at a seal portion in a threaded joint fasting step but also the excessively large plastic deformation of the whole surface of the shoulder when a compressive load is applied thus providing a threaded joint for an oil country tubular goods having excellent durability.

REFERENCE SIGNS LIST

1: box
2: oil country tubular goods
3: pin
5: internally-threaded portion (box-side)
7: externally-threaded portion (pin-side)
8: nose (pin nose)
10: orthogonal line of tube axis
11, 13: seal portion (metal to metal contact seal portion)
12: shoulder (pin-side)
14: shoulder (box-side)
20: remotest point from pin tube axis in pin-side shoulder (pin distal end)
25: remotest point from box tube axis in box-side shoulder
AXIS: tube axis
F: contact force
SP: seal point

DETAILED DESCRIPTION

Figure 4A:
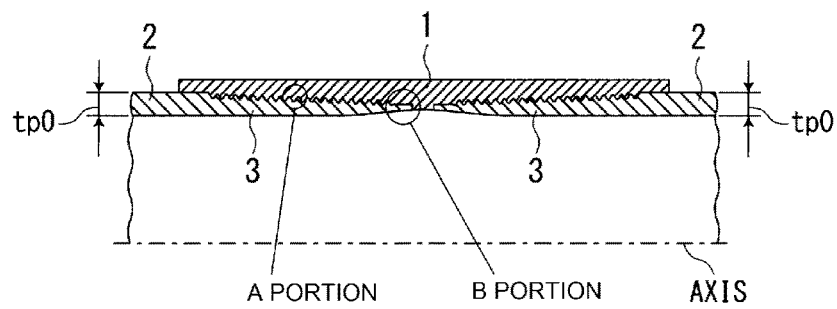
FIGS. 4A-4C are cross-sectional views exemplifying a conventional special threaded joint in the axial direction of a raw pipe.
Figure 4B:
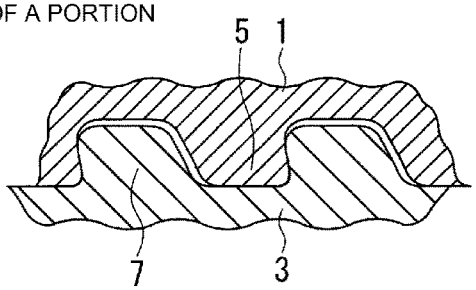
Figure 4C:
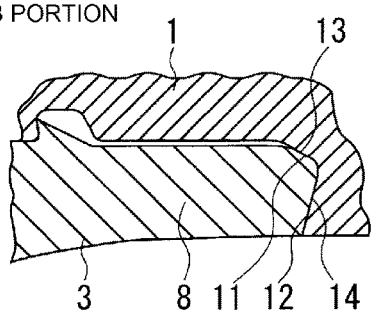

It is premised that our threaded joint is a radial-seal-type premium joint. This premise means that the threaded joint is modified into a radial-seal-type threaded joint shown in FIGS. 4A-4C, and includes: pins 3 each of which occupies a pipe end portion of a steel pipe for an oil well pipe 2, and includes an externally-threaded portion 7, a nose (pin nose) 8 extending toward a pipe end side from the externally-threaded portion 7, and a shoulder 12 forming a distal end surface of the nose 8; and a box 1 including internally-threaded portions 5 each forming a threaded portion by being threadedly joined with the externally-threaded portion 7, and shoulders 14 brought into contact with the shoulders 12 of the pins 3. The pins 3 and the box 1 are joined to each other by the threaded joining so that portions between the threaded portions and the shoulders are brought into metal-to-metal contact with each other thus forming seal portions 11, 13 which seal a fluid at the contact portions. The shoulders 12 of the pins 3 and the shoulders 14 of the box 1 are brought into contact with each other at the time of make-up the threaded joint thus forming shoulder faces.

Figure 1:
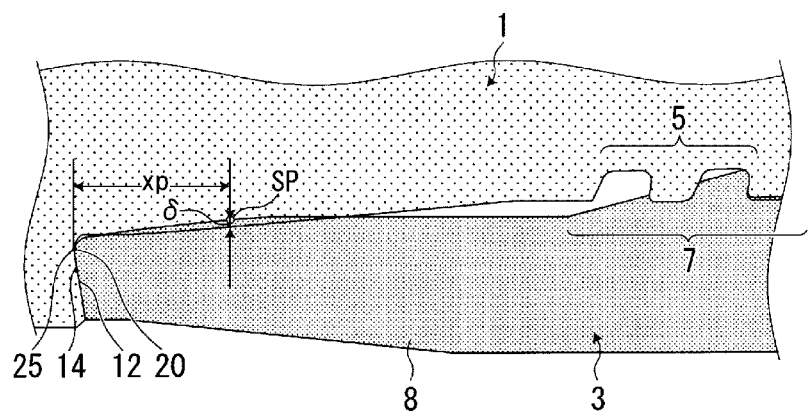
FIG. 1 is a cross-sectional view in the axial direction of a raw pipe showing a state where drawings at the same scale of both a pin and a box overlap with each other.
Figure 2:
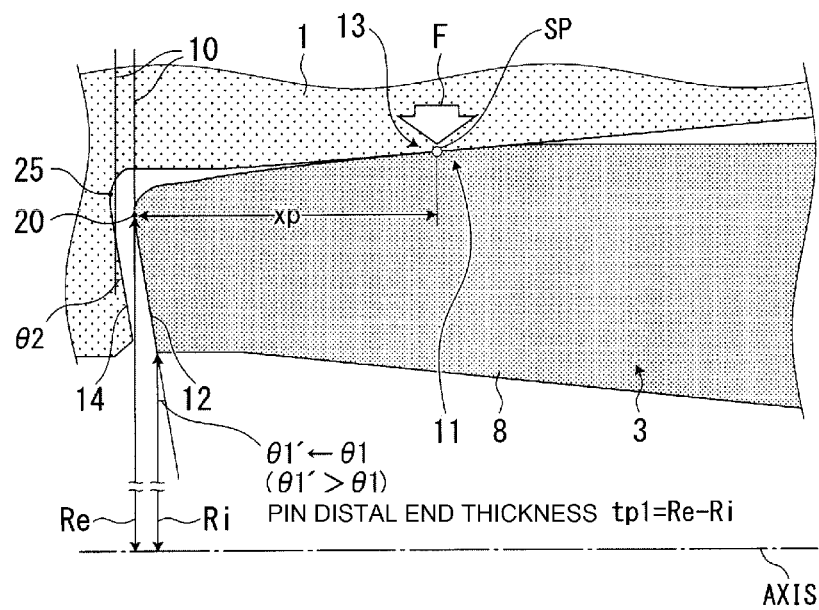
FIG. 2 is a cross-sectional view of the threaded joint for an oil country tubular goods in the axial direction of the raw pipe showing the behavior of a nose during make-up of a threaded joint.

A pin-side shoulder angle θ1, a box-side shoulder angle θ2, a seal interference quantity δ and a seal point distance xp which are exemplified in FIGS. 1 and 2 and are defined in items (i) to (iv) below satisfy the relationship $$\theta2-\theta1=\alpha \times \delta/xp, \alpha=7 \text{ to } 14, \text{ and}$$

a pin distal end thickness tp1 which is exemplified in FIG. 2 and is defined by a difference Re−Ri between a radius Re of a pin most distal end portion and an inner radius Ri of a pin distal end portion is 0.25 times or more as large as a pin raw pipe thickness tp0. The above-mentioned items (i) to (iv) are described as follows using symbol indicating parts in FIGS. 1 and 2.

(i) The pin-side shoulder angle θ1 is a value of an angle (degrees) of an intersecting angle between an orthogonal line of tube axis 10 and the pin-side shoulder 12 at an acute angle side.

(ii) The box-side shoulder angle θ2 is a value of an angle (degrees) of an intersecting angle between the orthogonal line of tube axis 10 and the box-side shoulder 14 on an acute angle side.

(iii) The seal interference quantity δ is a maximum value of a length in a pipe radial direction of an overlapping portion where cross-sectional views at the same scale of both the pin 3 and the box 1 in a tube axis direction are made to overlap with each other such that a tube axis AXIS of the pin 3 and a tube axis AXIS of the box 1 agree with each other and positions in a tube axis direction of points 20, 25 remotest from the tube axes AXIS in the respective shoulders 12, 14 of both the pin 3 and the box 1 agree with each other.

(iv) The seal point distance xp is a distance in a tube axis direction from a seal point SP which is a pin 3 outer diameter in-plane position where a length of the overlapping portion in a pipe radial direction becomes the largest to a pin most distal end position 20.

FIG. 2 is a cross-sectional view in a tube axis AXIS direction showing the behavior of the nose 8 during make-up of the threaded joint (referred to as "make-up"). As shown in FIG. 2, during the make-up, a pin pipe end side of the nose 8 is subjected to diametrically reduced deformation due to an action of a contact force F generated between a portion forming the seal portion 11 on a pin 3 side and the seal portion 13 on a box 1 side and hence, a pin-side shoulder angle θ1' when the shoulders 12 of the pin 3 and the shoulders 14 of the box 1 are made to abut each other becomes a value larger than the pin side shoulder angle θ1 on the drawing (before performing make-up).

Figure 3:
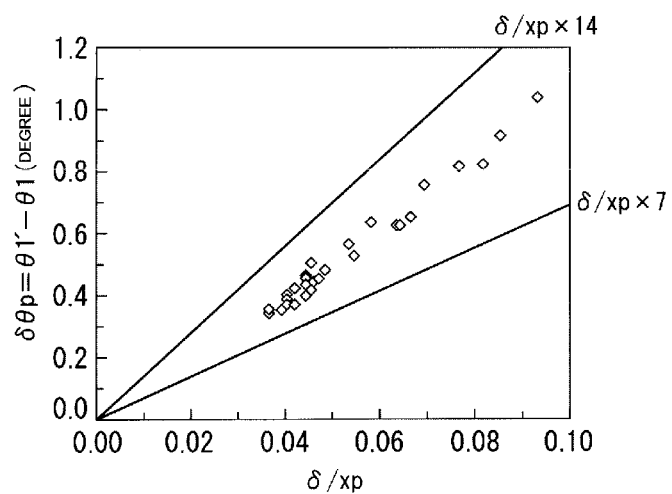
FIG. 3 is a graph showing advantages of our threaded joints.

In the radial-seal-type threaded joint, the seal point SP is positioned at a location remote from a pin pipe end. Hence, a change δθP(=θ1'−θ1) of a pin side shoulder angle generated by the above-mentioned diametrically reduced deformation is large. Usually, shoulder angles θ1, θ2 satisfy a relationship expressed by θ2=θ1. However, when δθp is large, the difference between θ2 and θ1' becomes excessively large, and a gap is formed on an inner diameter side of the shoulder. When the gap is formed on the inner diameter side where a corrosive fluid flows, crevice corrosion occurs. Hence, the threaded joint cannot be used for a long period. Accordingly, the make-up simulation calculation is performed with respect to various kinds of threaded joints using an FEA (Finite Element Analysis) thus performing the investigation for searching design factors which influence δθP. As a result, for example, as shown in FIG. 3, we found that δθP is substantially proportional to δ/xp, that is, δθP=σ×δ/xp. Further, we found that when a factor of the proportionality α is 7 to 14, θ1' becomes a value substantially equal to θ2 so that crevice corrosion hardly occurs. That is, to acquire the relationships of θ1'≈θ2, it is sufficient to perform the following calculations. θ1=θ2−δθP=θ2−α×δ/xp (meaning α=7 to 14)⇒ θ2−θ1=α×δ/xp (meaning α=7 to 14)

By setting the shoulder angles in this manner, crevice corrosion can be efficiently suppressed.

However, when a pin distal end thickness tp1 (=Re−Ri) is less than 0.25×tp0, the plastic deformation of the whole distal end of the pin is liable to occur due to a compressive load at the time of running which follows make-up. Hence, the threaded joint cannot be repeatedly used. Accordingly, to suppress such plastic deformation, it is necessary to set the pin distal end thickness tp1 to satisfy a relationship expressed by tp1≥0.25×tp0. When the pin distal end thickness tp1 becomes excessively large, rigidity of a distal end portion of the pin becomes excessively large and hence, galling is liable to occur due to an excessively large contact force of the seal portion. In view of such a disadvantage, the pin distal end thickness tp1 is preferably set to satisfy a relationship expressed by tp1≤0.49×tp0.

EXAMPLES

Make-up is made with a low torque (40000N·m) using pins formed by applying thread cutting to pipe end portions of steel pipes for oil well pipe made of carbon steel (yield strength: 90 ksi=620 MPa) corresponding to L80 of API Standard and having an outer diameter of 9⅝" (9.625 inch) and a wall thickness of 0.545" (inch) and the box corresponding to the pins. Threaded joints for an oil country tubular goods having data levels with respect to a seal condition and a shoulder angle shown in Table 1 are prepared. Using these threaded joints as test samples, a compressive force in the axial direction (1119 klbf=4978 kN) which generates a stress corresponding to 80% of a yield strength is applied to a pipe body and, thereafter, a tensile force in the axial direction (1119 klbf=4978 kN) which generates a stress corresponding to 80% of the yield strength is applied to the pipe body. In such a state, a gap formation test is performed to investigate the presence (NG) and the non-presence (OK) of the generation of a gap between the pin-side shoulder and the box-side shoulder on an inner surface.

The test result is shown in Table 1. As shown in Table 1, our examples exhibit the desired properties at all levels, and it is apparent that our threaded joints are effective to prevent crevice corrosion.

TABLE 1

| | Seal condition | | | Shoulder angle | | | | Pin distal end thickness | | Gap | |
|---|---|---|---|---|---|---|---|---|---|---|---|
| Level | δ ["](inch) | xp ["](inch) | δ/xp [—] | Pin side θ1 [degree] | Box Side θ2 [degree] | Δθ (=θ2 − θ1) [degree] | Δθ/(δ/xp) [degree] | tp1 ["](inch) | tp1/tp0 [—] | formation test | Remarks |
| 1 | 0.030 | 0.300 | 0.100 | 9.5 | 10.5 | 1.0 | 10.0 | 0.200 | 0.367 | OK | Our example |
| 2 | 0.020 | 0.100 | 0.200 | 9.5 | 11.0 | 1.5 | 7.5 | 0.250 | 0.459 | OK | Our example |
| 3 | 0.020 | 0.250 | 0.080 | 14.5 | 15.5 | 1.0 | 12.5 | 0.210 | 0.385 | OK | Our example |
| 4 | 0.026 | 0.400 | 0.065 | 15.0 | 15.9 | 0.9 | 13.8 | 0.180 | 0.330 | OK | Our example |
| 5 | 0.016 | 0.320 | 0.050 | 17.0 | 17.4 | 0.4 | 8.0 | 0.140 | 0.257 | OK | Our example |
| 6 | 0.030 | 0.200 | 0.150 | 15.0 | 15.0 | 0.0 | 0.0 | 0.200 | 0.367 | NG | Comparative example |

TABLE 1-continued

| | Seal condition | | | Shoulder angle | | | | Pin distal end thickness | | Gap | |
|---|---|---|---|---|---|---|---|---|---|---|---|
| Level | $\delta$ ["](inch) | xp ["](inch) | $\delta$/xp [—] | Pin side $\theta 1$ [degree] | Box Side $\theta 2$ [degree] | $\Delta\theta$ (=$\theta 2$ − $\theta 1$) [degree] | $\Delta\theta/(\delta/xp)$ [degree] | tp1 ["](inch) | tp1/tp0 [—] | formation test | Remarks |
| 7 | 0.030 | 0.300 | 0.100 | 10.0 | 10.6 | 0.6 | 6.0 | 0.150 | 0.275 | NG | Comparative example |
| 8 | 0.030 | 0.400 | 0.075 | 9.5 | 10.5 | 1.0 | 13.3 | 0.130 | 0.239 | NG | Comparative example |

[Note]
tp0: pin raw pipe thickness

The invention claimed is:

1. A threaded joint comprising:

pins, each of which occupies a pipe end portion of a steel pipe for an oil well pipe, and includes an externally-threaded portion, a nose extending toward a pipe end side from the externally-threaded portion, and a shoulder forming a distal end surface of the nose; and a box including internally-threaded portions each forming a threaded portion by being threadedly joined with the externally-threaded portion, and shoulders brought into contact with the shoulders of the pins, the pins and the box are joined to each other by the threaded joining so that portions between the threaded portions and the shoulders are brought into metal-to-metal contact with each other thus forming seal portions which seal a fluid at the contact portions, and the shoulders of the pins and the shoulders of the box are brought into contact with each other at the time of make-up the threaded joint, wherein a pin-side shoulder angle $\theta 1$, a box-side shoulder angle $\theta 2$, a seal interference quantity $\delta$ and a seal point distance xp defined below satisfy $\theta 2 - \theta 1 = \alpha \times \delta/xp, \alpha = 7$ to 14, and a pin distal end thickness tp1 defined by a difference Re−Ri between a radius Re of a pin most distal end portion and an inner radius Ri of a pin distal end portion is 0.25 times or more as large as a pin raw pipe thickness tp0, wherein $\theta 1$, $\theta 2$, $\delta$ and xp are:

(i) the pin-side shoulder angle $\theta 1$ is a value of an angle (degrees) of an intersecting angle between an orthogonal line of tube axis and the pin-side shoulder at an acute angle side, (ii) the box-side shoulder angle $\theta 2$ is a value of an angle (degrees) of an intersecting angle between the orthogonal line of tube axis and the box-side shoulder on an acute angle side, (iii) the seal interference quantity $\delta$ is a maximum value of a length in a pipe radial direction of an overlapping portion where cross-sectional views at the same scale of both the pin and the box in a tube axis direction overlap with each other such that a tube axis of the pin and a tube axis of the box agree with each other and positions in a tube axis direction of points remotest from the tube axes in the respective shoulders of both the pin and the box agree with each other, and (iv) the seal point distance xp is a distance in a tube axis direction from a seal point SP which is a pin outer diameter in-plane position where a length of the overlapping portion in a pipe radial direction becomes the largest to a pin most distal end position.

* * * * *